United States Patent
Levola

(10) Patent No.: US 7,483,604 B2
(45) Date of Patent: Jan. 27, 2009

(54) DIFFRACTIVE GRATING ELEMENT FOR BALANCING DIFFRACTION EFFICIENCY

(75) Inventor: Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/538,972

(22) PCT Filed: Dec. 12, 2003

(86) PCT No.: PCT/FI03/00948

§ 371 (c)(1),
(2), (4) Date: Jun. 14, 2005

(87) PCT Pub. No.: WO2004/055556

PCT Pub. Date: Jul. 1, 2004

(65) Prior Publication Data

US 2006/0051024 A1 Mar. 9, 2006

(30) Foreign Application Priority Data

Dec. 16, 2002 (FI) .................................. 20022199

(51) Int. Cl.
*G02B 6/30* (2006.01)
*G02B 5/18* (2006.01)
(52) U.S. Cl. .................. 385/37; 359/566; 359/567; 359/569; 359/573
(58) Field of Classification Search ............. 385/37
See application file for complete search history.

(56) References Cited

U.S. PATENT DOCUMENTS

| | | | | |
|---|---|---|---|---|
| 4,733,065 A | | 3/1988 | Hoshi et al. | |
| 4,779,259 A | * | 10/1988 | Kono et al. | 369/112.27 |
| 4,861,128 A | * | 8/1989 | Ishikawa et al. | 385/37 |
| 5,101,297 A | * | 3/1992 | Yoshida et al. | 359/566 |
| 5,142,394 A | * | 8/1992 | Asada et al. | 349/194 |
| 5,279,924 A | * | 1/1994 | Sakai et al. | 430/290 |
| 5,956,164 A | * | 9/1999 | Waitts | 359/2 |
| 6,285,813 B1 | * | 9/2001 | Schultz et al. | 385/37 |
| 6,313,888 B1 | * | 11/2001 | Tabata | 348/790 |
| 6,805,490 B2 | * | 10/2004 | Levola | 385/67 |
| 7,101,048 B2 | * | 9/2006 | Travis | 353/69 |
| 7,181,108 B2 | * | 2/2007 | Levola | 385/37 |

(Continued)

FOREIGN PATENT DOCUMENTS

DE 3522849 A1 1/1986

(Continued)

OTHER PUBLICATIONS

EP Office Action issued Mar. 3, 2008 in parallel European Patent Application No. 03778372.7, pp. 1-5.

(Continued)

*Primary Examiner*—Michelle R Connelly Cushwa
*Assistant Examiner*—Rhonda S Peace

(57) ABSTRACT

A diffractive grating element is divided into at least two different grating regions each having different diffractive properties and arranged on opposite sides with respect to a transition point to form a splitted grating structure. The diffractions generated by the at least two different grating regions are arranged to mutually compensate for the variation in the input angle of the incident light wave to the total diffraction efficiency of the at least one diffracted light wave that is arranged to propagate within the substrate.

12 Claims, 13 Drawing Sheets

U.S. PATENT DOCUMENTS

| | | | |
|---|---|---|---|
| 2003/0180022 A1* | 9/2003 | Kimura | 385/129 |
| 2004/0233534 A1* | 11/2004 | Nakanishi et al. | 359/572 |
| 2006/0215972 A1* | 9/2006 | Volodin et al. | 385/100 |

FOREIGN PATENT DOCUMENTS

| | | |
|---|---|---|
| EP | 0535402 A1 | 4/1993 |
| EP | 1215522 A2 | 6/2002 |
| JP | 10-186120 | 7/1998 |
| WO | WO 99/52002 | 10/1999 |
| WO | WO 01/96817 A1 | 12/2001 |

OTHER PUBLICATIONS

Japanese Office Action dated Aug. 5, 2008 issued in parallel Japanese Patent Application No. 2004-560539 (4 pages).

English Translation of Japanese Office Action dated Aug. 5, 2008 in parallel Japanese Patent Application 2004-560539 (6 pages).

English Abstract of JP 10-186120 "Diffraction Optical Element, and Optical System and Optical Euqipment Having the Same" (1 page), Published Jul. 14, 1998, Canon KK applicant.

* cited by examiner

Continuous grating with asymmetric period profile

Prior art

Beam shifting, at the edge

Beam shifting alternative setup

Compensation of Angular dependence

Monocular EPE

DIFFRACTIVE GRATING ELEMENT FOR BALANCING DIFFRACTION EFFICIENCY

CROSS-REFERENCE TO RELATED APPLICATIONS

Field of the Invention

This application is the U.S. National Stage of International Application Number PCT/FI2003/000948 filed Dec. 12, 2003, published in English Jul. 1, 2004, under International Publication Number WO 2004/055556 and which claims priority to Finnish Patent Application No. 20022199 filed on Dec. 16, 2002.

The present invention relates to a diffractive grating element arranged on or embedded within a light-transmittive, preferably planar waveguiding substrate and arranged to interact with an incident light wave in order to couple the energy from said incident light wave into said substrate to form at least one diffracted light wave propagating within said substrate and corresponding to at least one selected diffraction order.

BACKGROUND OF THE INVENTION

Display technology is one of the key elements in the development of new portable devices, which today typically feature wireless connectivity for voice and data access—and that will include a display for viewing, for example, text, graphics and different types of multimedia. The displays of such portable devices need to be increasingly capable of reproducing high quality still images and also live video. Such devices include, for example, advanced mobile phones and portable Internet appliances.

Many portable products are dominated by the display—both physically and from the cost perspective. The fact is that almost all other electronic components in such devices are shrinking in size except the display. The use of a microdisplay-based system instead of a large size direct view display panel promises one possible way to get over these limitations. Microdisplay-based systems may be generally defined as systems where the image produced by an image source has to be magnified for viewing. Generally, such microdisplay-based systems are driven by small, high-resolution integrated circuit display chips, but other configurations are possible too.

Microdisplays offer designers a chance to increase the displayed image size and resolution, yet physically shrink the size of the image source itself. In many cases, the smaller the image source, the lower the cost. So, not only do microdisplays promise to lower system costs, but their physically smaller size will mean less bulky and heavy products and smaller power consumption, that is they will operate longer with the same battery source. With a microdisplay-based system high pixel densities may be achieved. Many direct view flat-panel displays for instance, produce full colour pixels at only 3-4 lines/mm. Many microdisplay-based systems can provide full colour pixels at 50-100 lines per mm.

Microdisplay-based systems can be generally divided into two classes: projection display systems and virtual display systems.

Projection display systems create a real image on a screen. Suitable imaging optics magnify and project an image that is created on a display chip embedded within a projector.

Virtual microdisplay-based systems also use imaging optics to magnify an image, but to create a virtual image instead of a projected real image. A virtual image is what one sees when looking in an electronic viewfinder of a digital video camera, for example. The virtual image appears to be larger and floating at some distance from the eye of the observer—even though it is created by a small sized integrated display chip acting as the image source. In other words, the viewer has the illusion of seeing the source image as if he/she stands a certain distance away in front of a larger display monitor.

Virtual displays, which are kept close to the eye, can be monocular or biocular. One type of virtual display is, for example, a Head Up Display (HUD), where the imaging optics are located somewhat further away from the eye.

An important and well-known aspect in virtual display devices, as also in many other optical systems, is the exit pupil diameter of the system. The diameter and also the location of the exit pupil are of considerable practical importance defining largely the overall usability of the virtual display device. In visual instruments, including the virtual displays, the observer's eye needs to be positioned at the center of the exit pupil located behind the optical system in order to see the image with full field-of-view. In other words, the exit pupil is like a window, through which the virtual image can be seen.

The distance between the location of the exit pupil and the last optical component, for example, the eye-piece lens of a visual instrument is called eye relief. The eye relief, together with the exit pupil, defines the freedom of observation, i.e. the volume where the observer's eye can be located with respect to the optical system.

SUMMARY OF THE INVENTION

The current invention is especially related to such virtual display systems, where diffractive grating elements are used as a part of the imaging optics in order to create an enlarged virtual image from the smaller sized real image created by an image source, herein referred to as an imager, which is typically an integrated circuit display chip. The invention is not limited only to microdisplay-based systems, but can also be used in other virtual display systems. Besides display systems, the invention may in its generic form be utilized in other types of optical systems as well, where diffractive grating elements are used for expanding the exit pupil of the optical system.

The basic use of diffractive grating elements for expanding the exit pupil of an imaging system is already known in the art. For example, patent publication WO 99/52002 discloses optical devices, in which a plurality of holographic optical elements (HOEs), i.e. diffractive grating elements are arranged on a common planar light-transmittive substrate. The disclosed devices may be used for magnifying the exit pupil of the imaging optics, which produces a virtual image at infinity from a real image source, and to further reflect this virtual image into the eye of an observer. The enlargement of the exit pupil of a virtual display system with a beam-expanding optical configuration, such as with those described in the document WO 99/52002, results in larger eye relief, which makes the virtual display device more convenient to use. A significantly larger eye relief allows to move the display device further away from the immediate vicinity of the observer's eyes. This makes it possible to observe the virtual display in a manner resembling the use of an ordinary display panel reproducing real images.

Therefore, there is significant interest in optical beam expansion systems, which can be used to enlarge the diameter of the exit pupil, and further also the eye relief in virtual display systems. These optical beam expansion systems are hereafter referred to as exit pupil extenders (EPEs).

However, prior art solutions for EPEs based on the use of holographic/diffractive grating elements (HOEs, or DOEs, i.e. diffractive optical elements) have certain significant limitations, which in practice degrade the quality of the reproduced virtual images. One of these limitations is the fact that the diffraction efficiency of a DOE has rather strong angular dependency. Therefore, when the input angle of the light incident to an EPE changes, also the spatial distribution of the light in the EPE changes leading to non-uniform intensity/brightness distribution in the virtual image.

FIG. 1 describes in a very simplified cross-sectional view one possible configuration of a biocular type EPE. DOE1 couples the light from an imager into a transparent substrate S, where the light is further diffracted by DOE1 towards left and right directions to be waveguided along said substrate S. In the aforementioned directions the light travels inside the substrate S based on total internal reflections (TIR) until a second diffractive element DOE2 couples the light out from the substrate towards the observer. Separate DOE2s are arranged for the left and right eye of the observer. FIG. 2 presents another possible configuration for a biocular EPE, where the diffractive elements DOE1 and DOE2s are arranged on the upper surface of the substrate S instead of the lower surface. It is clear for a person skilled in the art that the diffractive elements DOE1, DOE2 forming an EPE can be arranged on a substrate also in certain other ways still maintaining the basic operation of the device.

FIG. 3 describes schematically the basic problem in EPEs that the current invention primarily aims to solve. A prior art type grating G (corresponding DOE1 in FIGS. 1 and 2) with symmetrical, and in this example sinusoidal grating period profile diffracts the incoming light having input angle $\theta$ into left and right 1st diffraction orders, marked $R_{-1}$ and $R_{+1}$, respectively. Here the period of the grating G has been selected in a manner that, in addition to the 0th order, diffraction takes place substantially only to left $R_{-1}$ and right $R_{+1}$ directions corresponding to the 1st diffraction order. It is evident for a person skilled in the art that when the input angle $\theta$ changes, the amount of light diffracted to the left and right directions along substrate S changes, i.e. the light is not divided between the directions $R_{-1}$ and $R_{+1}$ in an equally balanced manner.

FIG. 4 shows calculated angular dependency of diffraction efficiencies at the optimum profile depth of an aluminium coated grating G having symmetrical sinusoidal period profile and corresponding to the arrangement shown in FIG. 3. It is clear from FIG. 4 that when the input angle $\theta$ deviates from zero, then also the diffraction efficiency corresponding to $R_{-1}$ and $R_{+1}$ changes so that the light will be distributed non-uniformly between the left and right directions. In FIGS. 3 and 4 the sign of the input angle $\theta$ is defined so that the rotation of the incoming beam clockwise corresponds to negative input angles and vice versa.

FIG. 5 describes schematically the possibility to use a so-called blazed grating BG to affect the distribution of light between the left $R_{-1}$ and right $R_{+1}$ directions. Blazed gratings, where the profile of each period of the grating is asymmetrical in a certain way, are well known from the related art. By designing the grating period to have a suitable degree of asymmetry (blaze angle), the diffraction efficiency of the blazed grating can be affected and the diffraction can be concentrated into one or more selected diffraction orders, i.e. into selected directions.

The main purpose of the current invention is to present a novel solution for decreasing or eliminating completely the above explained angular dependency of the diffraction efficiency in a diffractive grating element. The invention is especially suitable for beam expansion purposes for example in EPEs and virtual display devices. A specific aim of the invention is to make possible to construct biocular and also monocular virtual display systems, where light can be uniformly distributed over the whole area of the exit pupil of the display in order to achieve high image quality.

To attain these purposes, a device comprising a waveguiding substrate and a diffractive grating element according to the invention comprises at least two different grating regions each having different diffractive properties and arranged on opposite sides with respect to a transition point to form a splitted grating element, wherein diffractions generated by said at least two different grating regions are arranged to mutually compensate for an effect of a variation in the input angle of the incident light wave at a given point of the gratings on the total diffraction efficiency of the at least one diffracted light wave propagating within the substrate. The detailed description below describes further some preferred embodiments of the invention.

The basic idea of the invention is to substitute a continuous diffractive grating element or structure having a grating profile extending in an unchangeably, substantially continuous manner over the whole area where the incoming beam interacts with said grating, with a grating structure experiencing a transition in the grating profile typically within said area of interaction. Preferably, in biocular systems, said transition in the grating profile takes place substantially in the center of said area of interaction, i.e. substantially in the location where the optical axis of the incoming beam passes through the grating. In the following a grating element according to the invention is referred shortly to as a "splitted grating". The point where the transition of the grating profile takes place, i.e. the point where the grating is "splitted" is referred to as the "transition point".

According to the invention, the angular dependency of a diffractive grating can be effectively compensated or eliminated using a splitted, preferably blazed grating together with input optics that have a certain beam offset as a function of the input angle.

In other words, the diffractive grating element according to the invention is divided into at least two different grating regions each having different diffractive properties and arranged on opposite sides with respect to the transition point to form a splitted grating structure. The diffractions generated by said at least two different grating regions are arranged to mutually compensate for the variation in the input angle of the incident light wave to the total diffraction efficiency of the at least one diffracted light wave that is arranged to propagate within said substrate.

In biocular systems, according to one preferred embodiment of the invention, the grating element is arranged to be symmetrically splitted, i.e. the grating period profiles of the two different sides of the grating are arranged to be substantially mirror images of each other respect to transition point. Further, the grating profile in each of said sides is preferably a blazed type profile.

In a monocular system the transition point is substantially outside the beam area, and the splitting is not symmetrical, as will be shown later. Therefore, the first interaction of the incident beam with the splitted grating element is arranged to take place substantially within a single grating region In monocular systems the less intense diffracted beam, $R_{-1}$, is recirculated towards the original direction of $R_{+1}$ beam. The intensity of said right hand side travelling beam is thus increased and its intensity is then substantially independent of incoming angle.

With the invention good image quality with high and even brightness over the whole exit pupil can be achieved in both monocular or biocular EPEs. One specific object of the invention is thus to allow the manufacture of virtual display devices with significantly larger exit pupil diameter than prior art solutions without degrading the image quality. Along with larger exit pupil diameters, also a significantly larger eye relief can be achieved.

The preferred embodiments of the invention and their benefits will become more apparent to a person skilled in the art through the description and examples given herein below, and also through the appended claims.

BRIEF DESCRIPTION OF THE DRAWINGS

In the following, the invention will be described in more detail with reference to the appended drawings, in which.

DETAILED DESCRIPTION OF THE INVENTION

Figure 1:
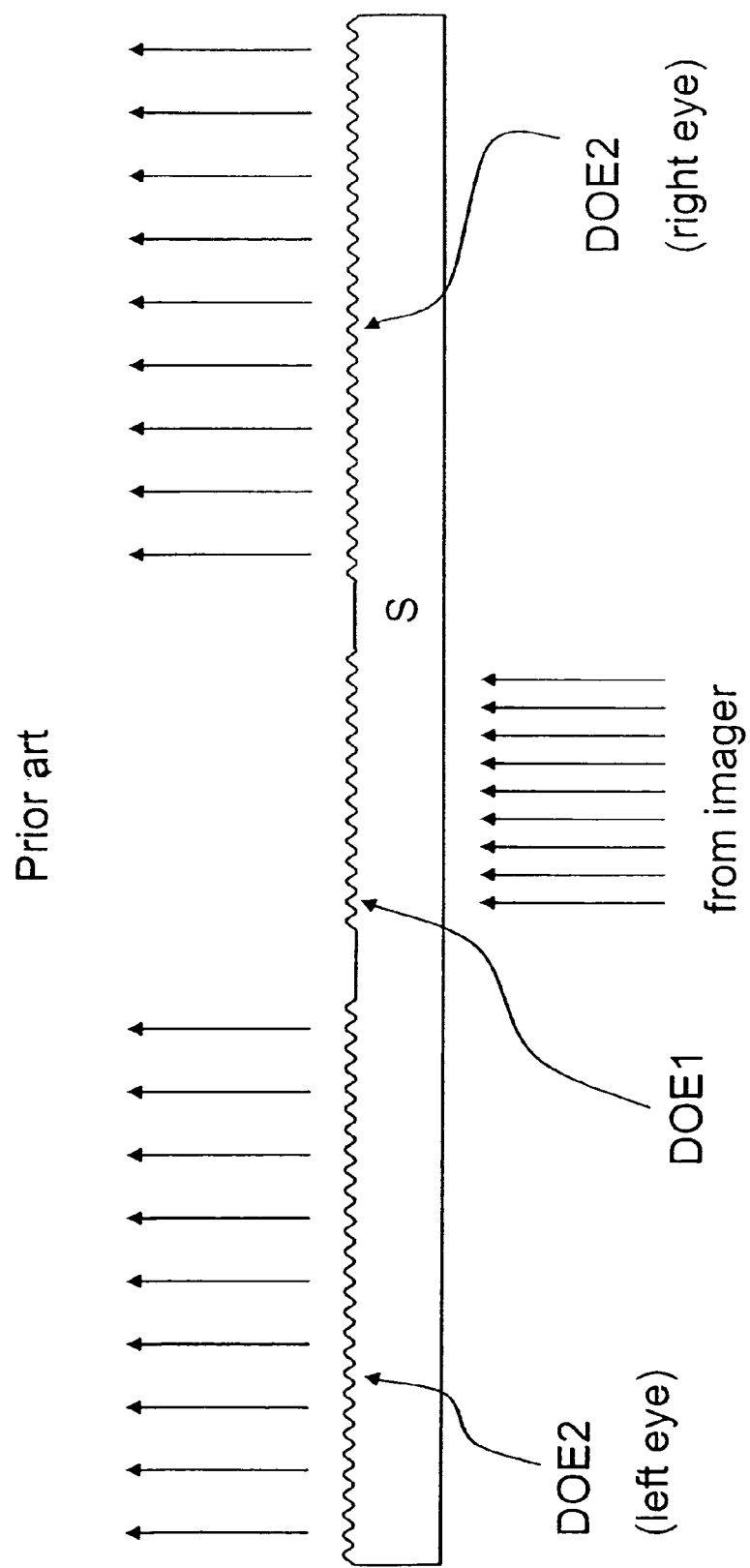
FIG. 1 illustrates schematically in a cross-sectional view one possible configuration of a biocular type EPE.

It is to be understood that the drawings presented herein below are designed solely for purposes of illustration and thus, for example, not for showing the various components of the devices in their correct relative scale and/or shape. For the sake of clarity, the components and details which are not essential in order to explain the spirit of the invention have been omitted in the drawings.

FIGS. 1-5, which present solutions known from the related art, have been already discussed above.

Figure 6:
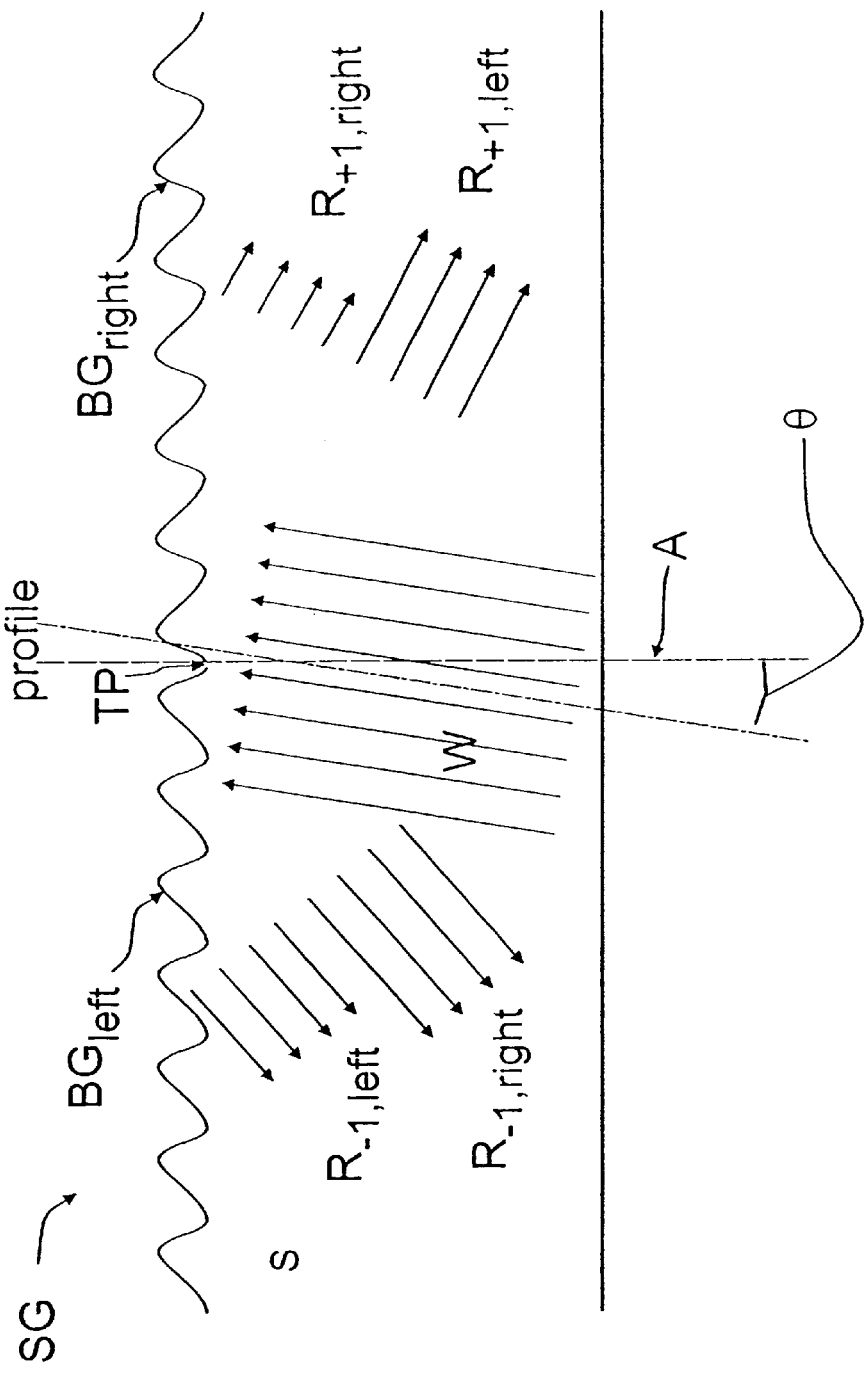

FIG. 6 illustrates schematically a preferred embodiment according to the invention. A grating profile with asymmetrical period profile, in this particular example with a blazed period profile, is splitted symmetrically with respect to a transition point TP into left $BG_{left}$ and right $BG_{right}$ sides to form a splitted grating element SG. The left $BG_{left}$ and right $BG_{right}$ sides of the grating are mirror images of each other with respect to said transition point TP. The transition point TP is arranged on the point where the optical axis A of the incoming beam passes through the grating surface.

Because the wavefront representing the incident beam hits now on both sides $BG_{left}$ and $BG_{right}$ of the grating element SG, the following diffracted beams are generated. $R_{-1,left}$ is generated from the first order diffraction towards left from the left side $BG_{left}$ of the grating. Correspondingly, $R_{+1,left}$ is generated from the first order diffraction towards right from the same left side $BG_{left}$ of the grating. In this example case, because the input angle θ has a negative value, $R_{+1,left}$ diffraction is stronger compared to $R_{-1,left}$ diffraction. In similar manner, the right side $BG_{right}$ of the grating creates diffraction $R_{-1,right}$ to the left and $R_{+1,right}$ to the right. Now, $R_{+1,right}$ diffraction is weaker compared to $R_{-1,right}$ diffraction. Because of the splitted construction of the grating SG, the total diffraction towards left and right are substantially equal: $R_{-1,left}$ summed up together with $R_{-1,right}$ equals substantially in intensity compared to $R_{+1,left}$ summed up together with $R_{+1,right}$. In other words, the different sides $BG_{left}$, $BG_{right}$ of the splitted grating element SG are arranged to mutually compensate for the variation in the input angle (θ) of the incident light wave (W).

Figure 7:
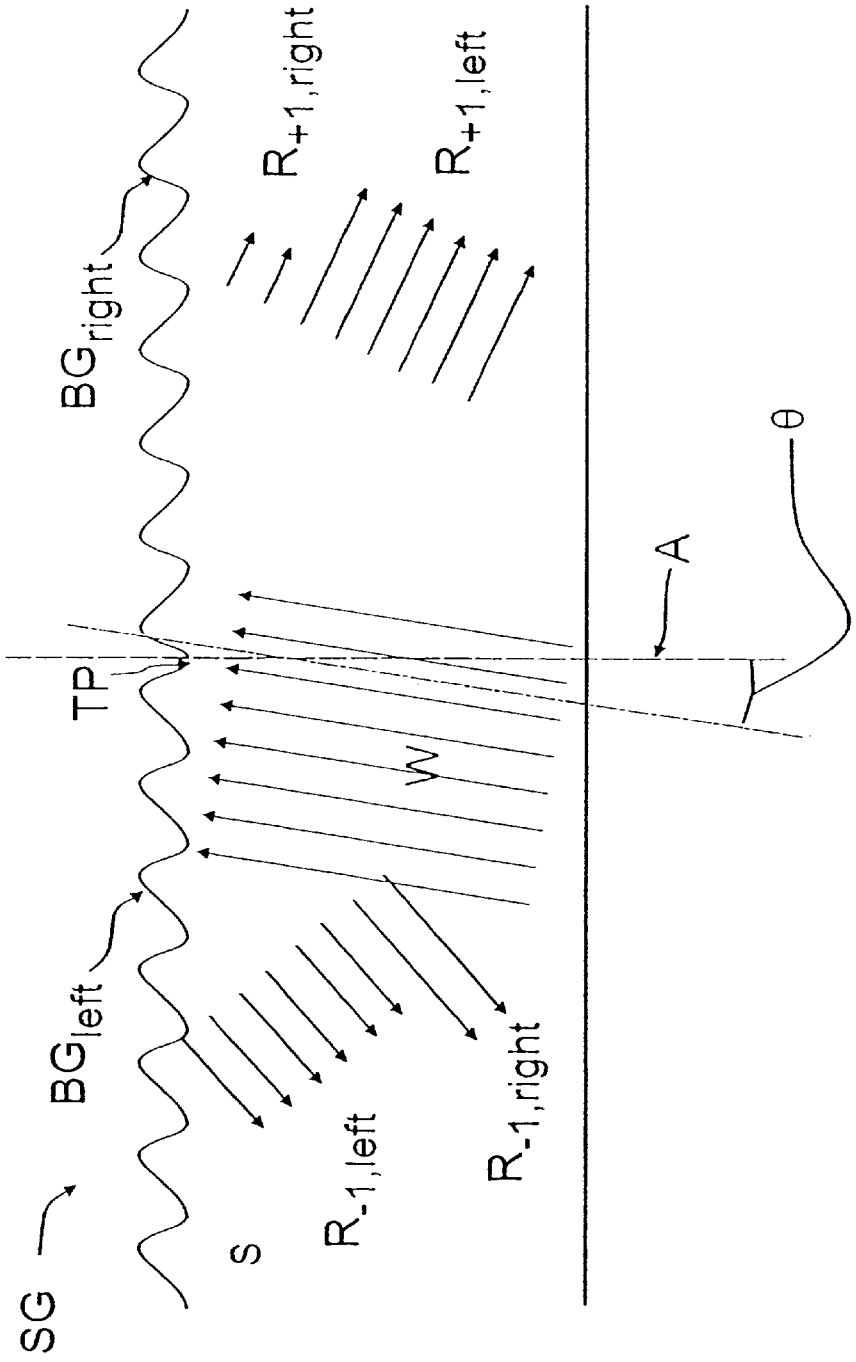

FIG. 7 illustrates schematically what happens when the beam incident to the splitted grating element SG shifts with respect to the transition point TP. The relative amount of diffraction generated by the left $BG_{left}$ and the right $BG_{right}$ side of the grating changes, but still $R_{-1,left}$ summed up together with $R_{-1,right}$ equals substantially in intensity compared to $R_{+1,left}$ summed up together with $R_{+1,right}$.

Figure 8:
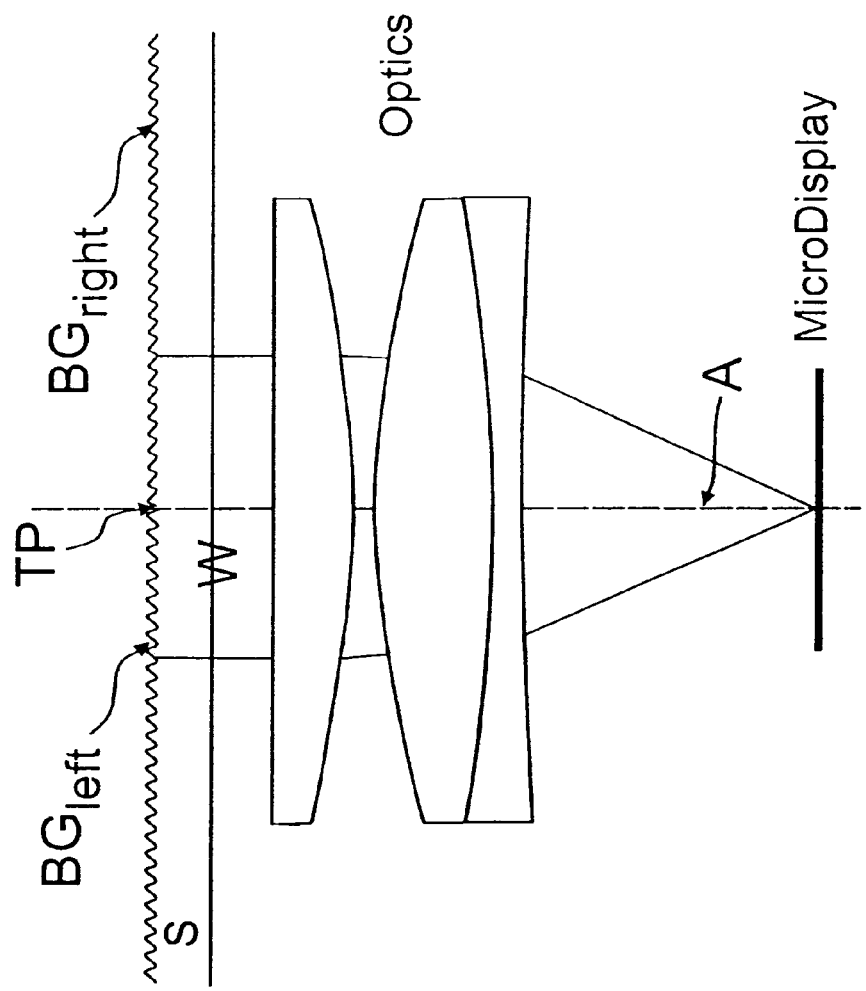
Figure 9:
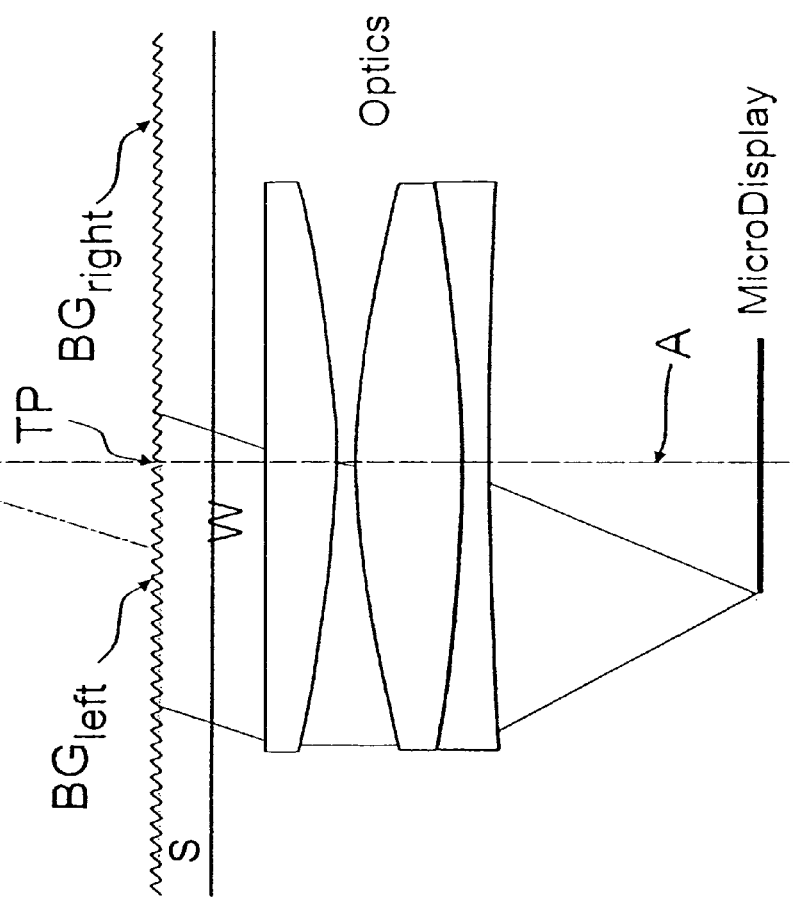

FIG. 8 illustrates schematically one possible optical setup for directing the light from an imager, for example from a microdisplay chip, towards the splitted grating element SG. FIG. 8 presents schematically how light from an image point located in the center of the imager surface is directed towards the grating through the ocular type optics. Correspondingly, FIG. 9 presents the case where an image point is located near the edge of the imager surface. It is evident for a person skilled in-the art that when the image point "moves" from the center of the image surface towards the edge of the same, also the input angle of the light incident on the grating changes together with the relative area of the beam hitting the two regions $BG_{left}$, $BG_{right}$ of the splitted grating element SG. However, according to the invention the total diffraction towards left ($R_{-1,left}+R_{-1,right}$) and right ($R_{+1,left}+R_{+1,right}$) directions along the substrate S are maintained substantially equal.

Figure 10:
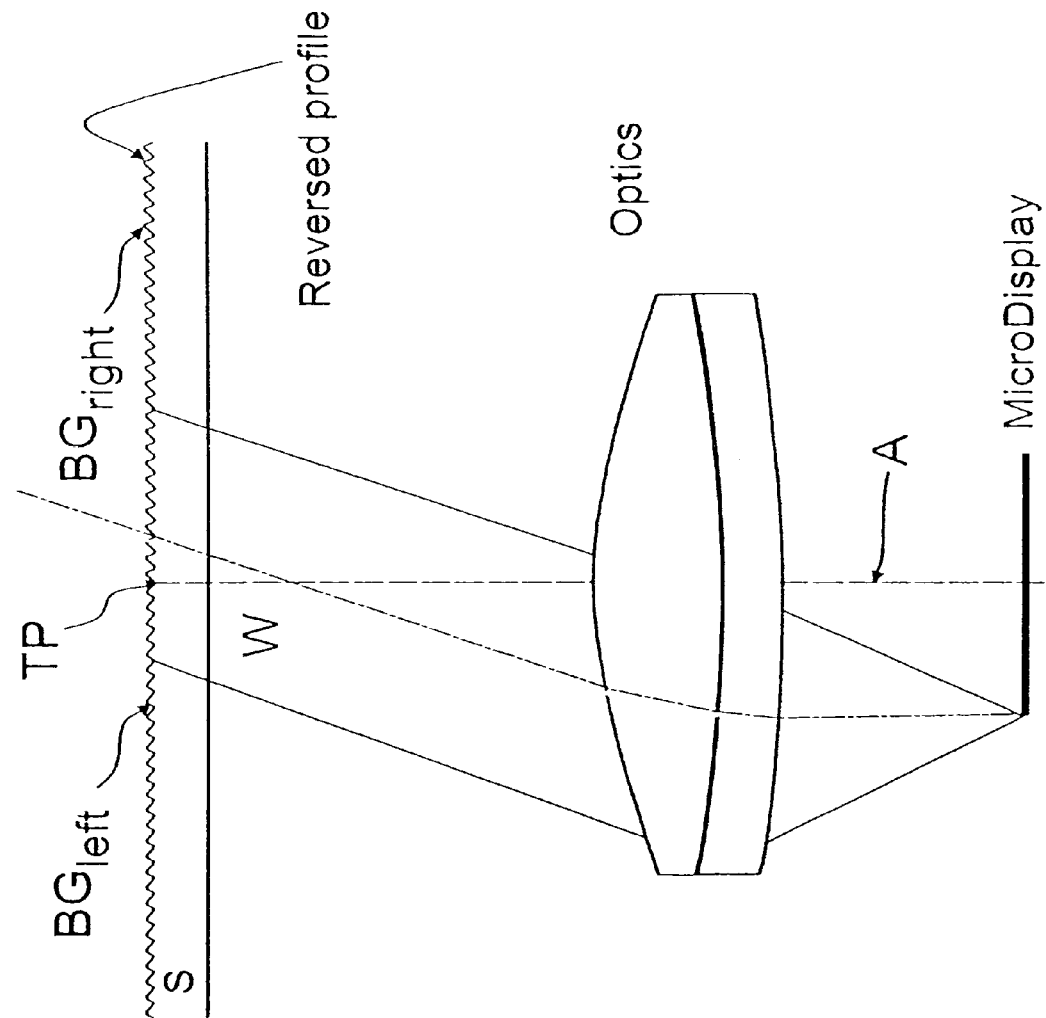

FIG. 10 illustrates an alternative optical setup for directing the light from an imager towards the splitted grating structure $BG_{left}$, $BG_{right}$. By reversing the asymmetric grating period profile, in this case by reversing the blaze angle, the ratio of $R_{-1}$ and $R_{+1}$ diffraction efficiencies becomes inversed. Therefore, for an off-centered image point the beam incident on the grating can be allowed to "cross" the center optical axis A and still be generating well balanced diffraction towards the left and right directions along the substrate S.

Figure 11:
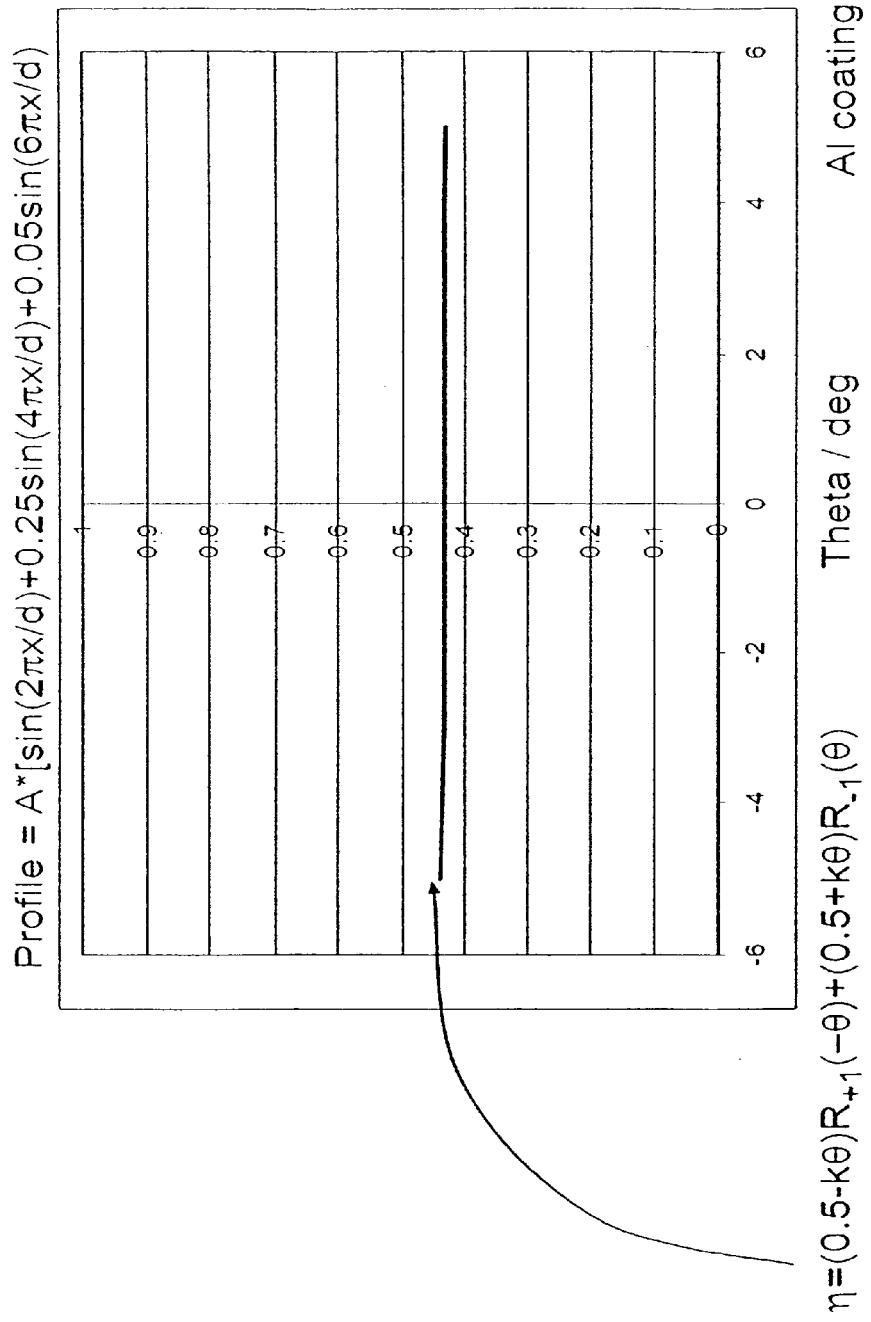
FIG. 11 shows simulation results for total diffraction efficiency of an aluminium coated splitted grating.

FIG. 11 shows simulation results for an aluminium coated splitted grating element SG having blazed period profile and corresponding basically to the arrangement shown in FIG. 6. The period profile of the grating is given by $$\text{Period}=A*[\sin(2\pi x/d)+0.25\sin(4\pi x/d)+0.05\sin(6\pi x/d)] \quad (1)$$

where A=max. height (amplitude) of the grating
x=location within a single grating period
d=length of a single grating period The total diffraction efficiency η as a function of the input angle θ is calculated as $$\eta = (0.5-k\theta)R_{+1}(-\theta) + (0.5+k\theta)R_{-1}(\theta) \quad (2)$$

In Eq. (2) k is a constant describing how much the beam shifts at a given angle. For example, it is needed that as the whole beam shifts onto the left side at extreme angle $\theta_{max}$, then k gets a maximum value of $05/\theta_{max}$. In other cases k gets values smaller than that. If k=0, then the beam is not shifted at all on the grating.

In the case, when the input angle θ=0 then the input beam is located symmetrically with respect to the transition point TP, i.e. the first half of the beam is incident on $BG_{left}$ and the second half of the beam is incident on $B_{right}$. It is evident from FIG. 8 that thanks to the splitted grating structure according to the invention, the total diffraction efficiency η remains substantially constant independent of the input angle θ in a situation where the beam "shifts" along the splitted grating depending on the location of the image point on the imager surface.

Figure 12:
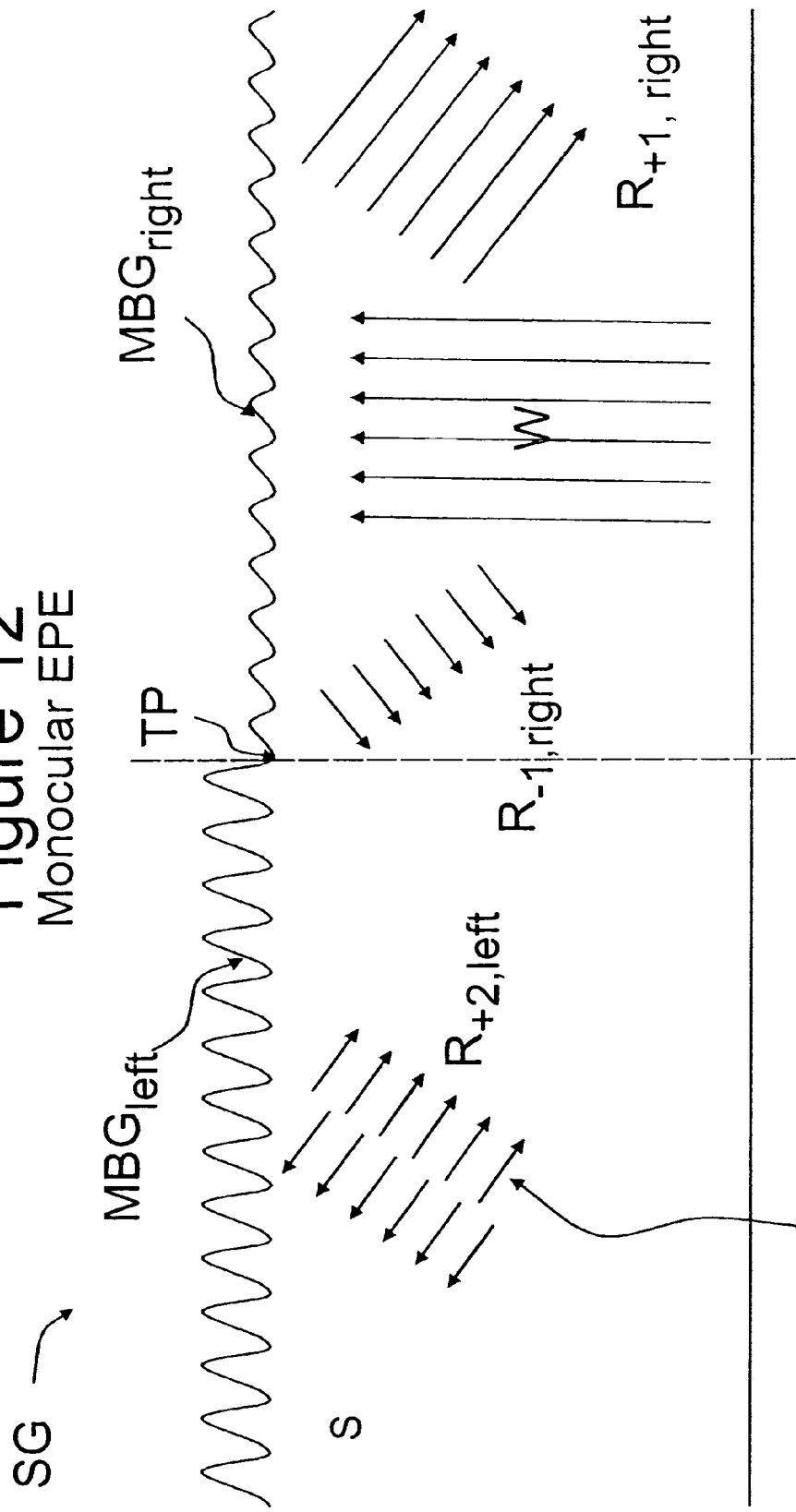
FIG. 12 shows schematically a monocular EPE based on a splitted grating according to the invention, and FIG. 13a,b show coupling efficiencies as a function of grating profile depth of a blazed grating having period of 440 nm and for wavelength 540 nm.

FIG. 12 describes schematically how a splitted grating element SG according to the invention can be utilized in a monocular EPE. In FIG. 12 the first interaction of the incident light wave (W) with the splitted grating element SG is arranged to take place substantially within a single grating region $M_{right}$. Here the splitted grating element SG comprises on the right side a grating surface $MBG_{right}$ optimized to generate first order diffraction $R_{+1,right}$ towards right along substrate S. On the left side, the grating surface $MBG_{left}$ is optimized to generate a second order diffraction $R_{+2,left}$ towards right along substrate S. The aforementioned construction provides effective "recirculation" of the $R_{-1,right}$ diffraction "leaking" undesirably from $MBG_{right}$ towards left along substrate S. Namely, based on Bragg reflection grating surface $MBG_{left}$ diffracts $R_{-1,right}$ back towards right as $R_{+2,left}$. It can be shown that this "recirculated" beam $R_{+2,left}$ is completely parallel with respect to the beam $R_{+1,right}$. Therefore, if the input angle θ of the beam incident to the right grating surface $MBG_{right}$ changes, altering the ratio of $R_{-1,right}$ and $R_{+1,right}$ reflections and the amount of light "leaking" towards right along the substrate S, the splitted grating structure is capable of recirculating the light travelling in the direction opposite than that desired.

Figures 13A, 13B:
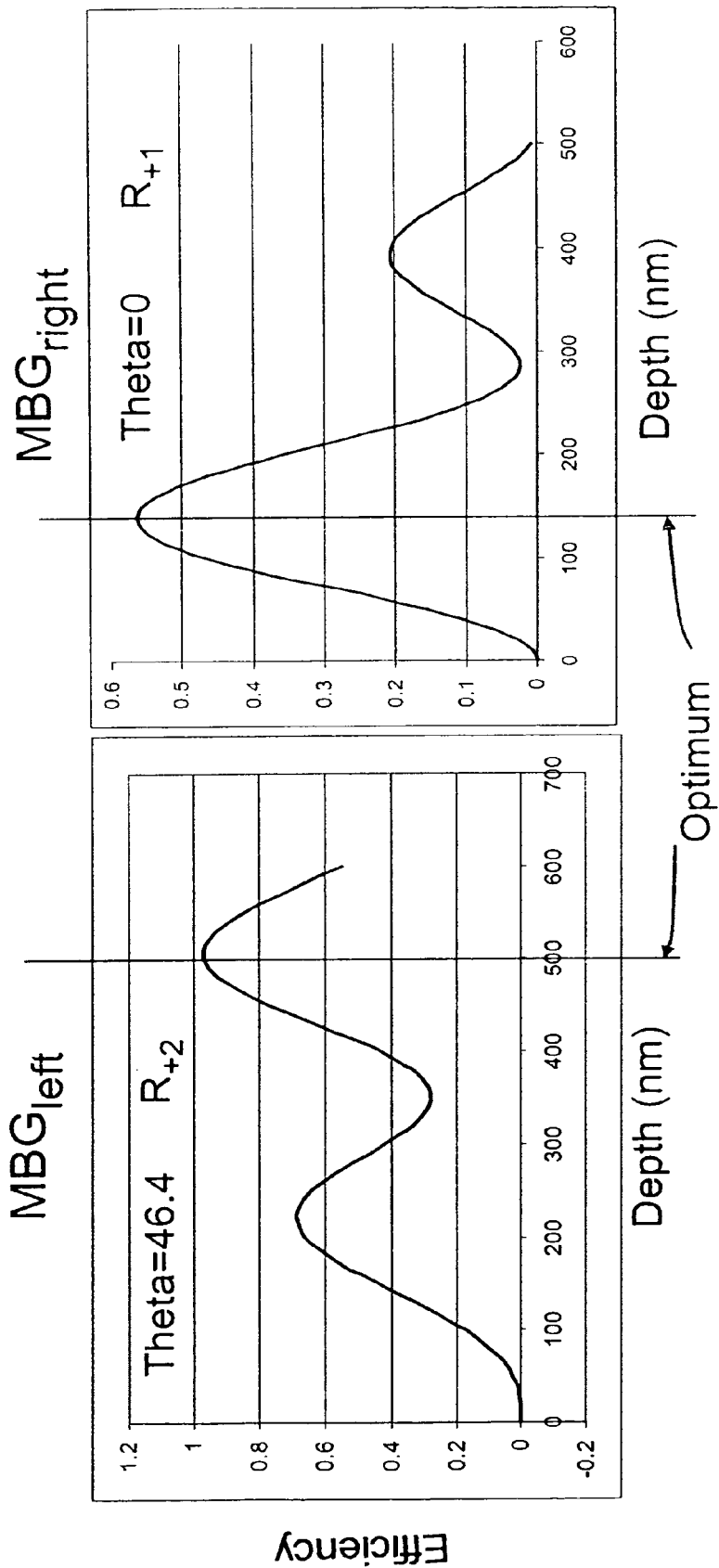
FIG. 13a corresponds to the diffraction of a light beam travelling inside the plate at an angle of 46.4 degrees.
FIG. 13b corresponds to diffraction of a beam entering the substrate plate substantially in perpendicular direction.

FIGS. 13a and 13b show how the coupling/diffraction efficiency of the grating surfaces $MBG_{right}$ and $MBG_{left}$ shown schematically in FIG. 12 depend on the depth of said grating profiles. The period of the gratings is given a value of 440 nm and the calculations have been performed for light having wavelength of 540 nm with refractive index of 1.71. From FIG. 13a it can be seen that for the Bragg reflection (46.4°) the efficiency of the left grating $MBG_{left}$ can be optimized to have almost value of one, i.e. the grating reflects essentially all of the light back towards direction $R_{+2}$. FIG. 13b corresponds to diffraction of a beam entering the substrate S plate substantially in perpendicular direction, i.e. corresponding $MBG_{right}$ in FIG. 12.

The preferred applications of the invention include different types of virtual display devices, where beam expansion in one or more directions is performed to extend the exit pupil of the display device. In such display devices the image source can be, for example, a sequential color LCOS-device (Liquid Crystal On Silicon), an OLED-device (Organic Light Emitting Diode), a MEMS-device (MicroElectroMechanical System) or any other suitable microdisplay device operating in transmission, reflection or emission.

While the invention has been shown and described above with respect to selected embodiments of virtual display devices, it should be understood that these embodiments are only examples and that a person skilled in the art could construct other embodiments utilizing technical details other than those specifically disclosed herein while still remaining within the spirit and scope of the present invention. It should therefore be understood that various omissions and substitutions and changes in the form and detail of the grating element illustrated, as well as in the operation of the same, may be made by those skilled in the art without departing from the spirit of the invention. It is the intention, therefore, to restrict the invention only in the manner indicated by the scope of the claims appended hereto.

Figure 2:
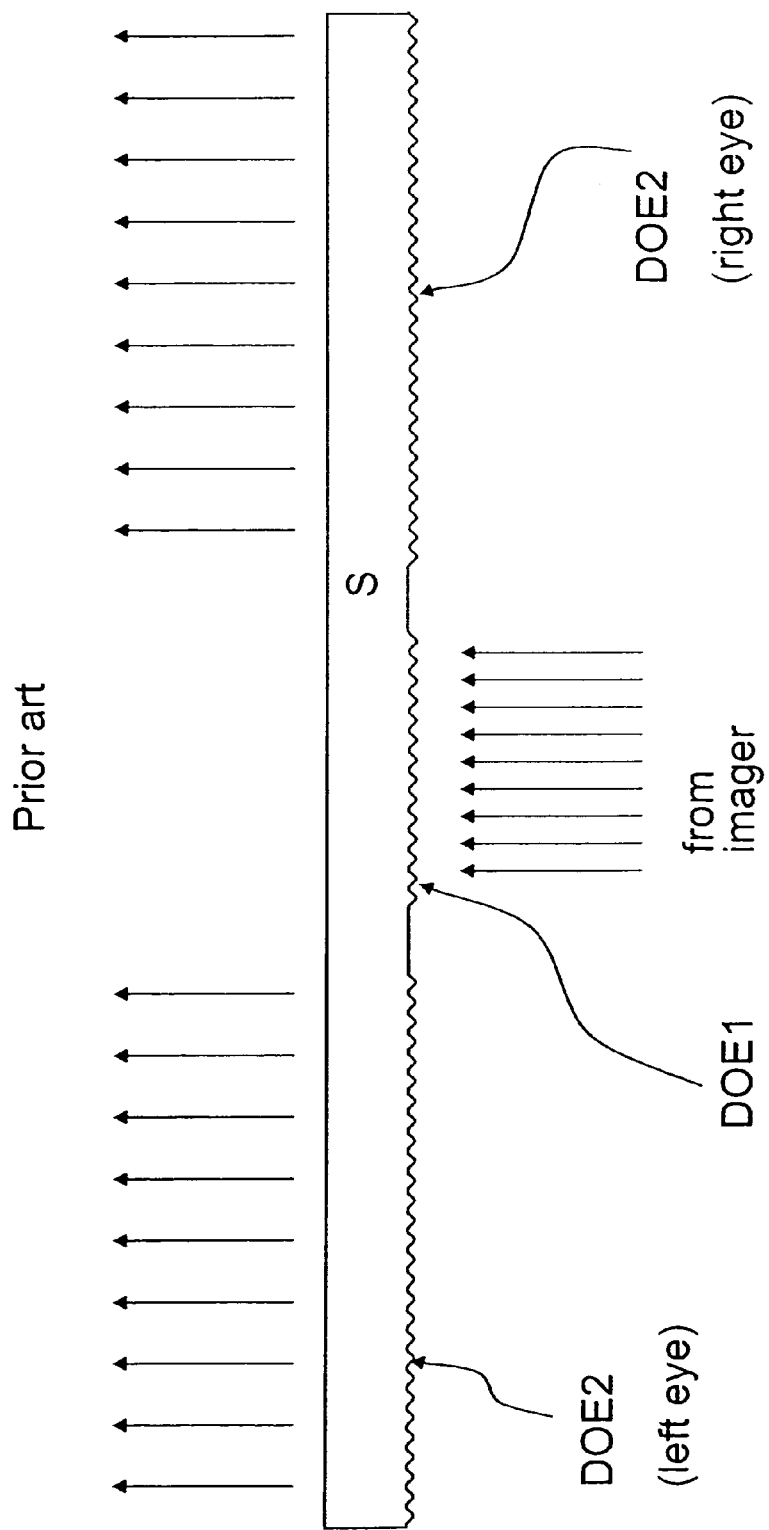
FIG. 2 illustrates schematically in a cross-sectional view another possible configuration of a biocular type EPE.
Figure 3:
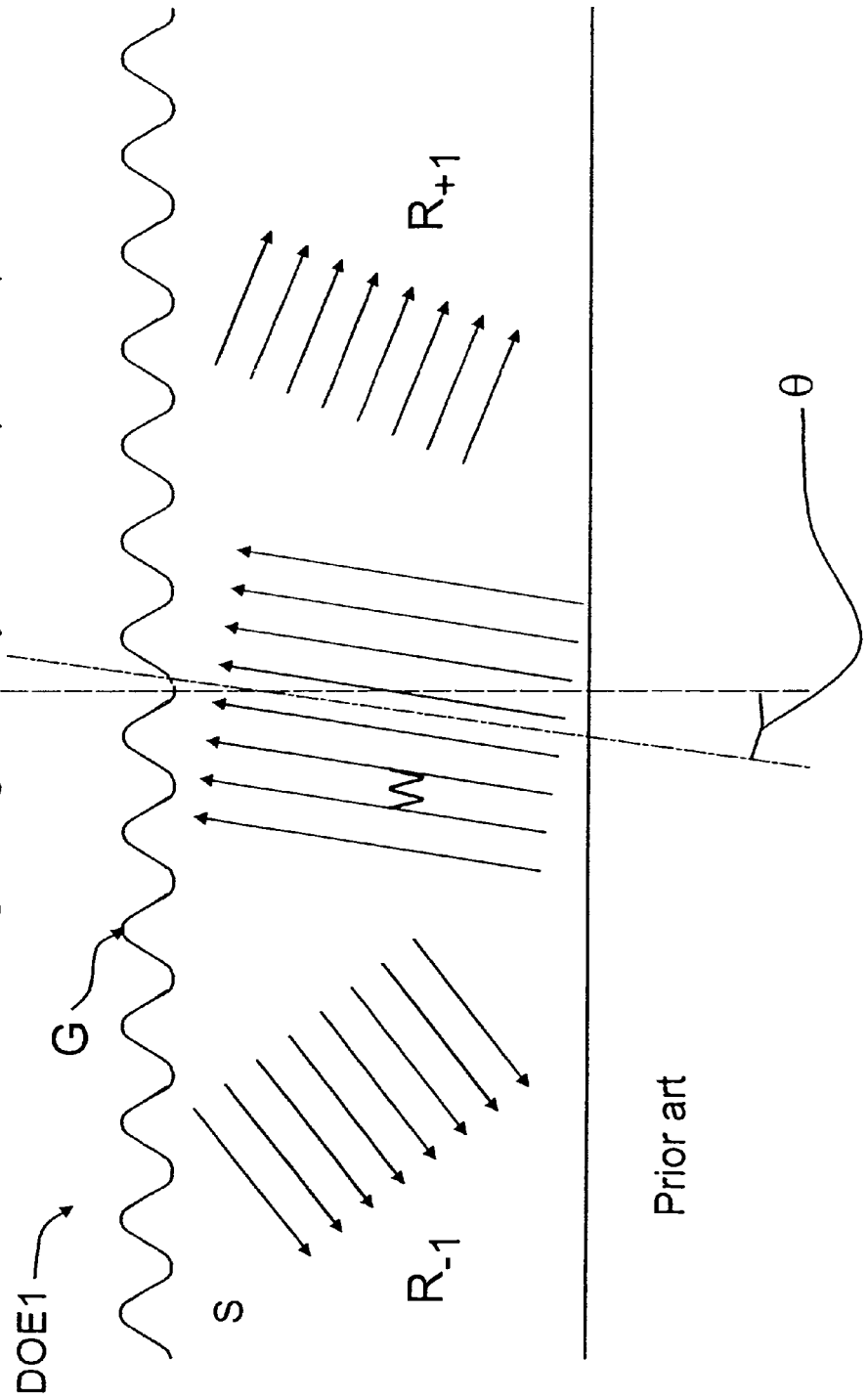
FIG. 3 illustrates schematically the basic problem existing in prior art EPEs related to the angular dependency of the diffraction efficiency of the grating element.
Figure 4:
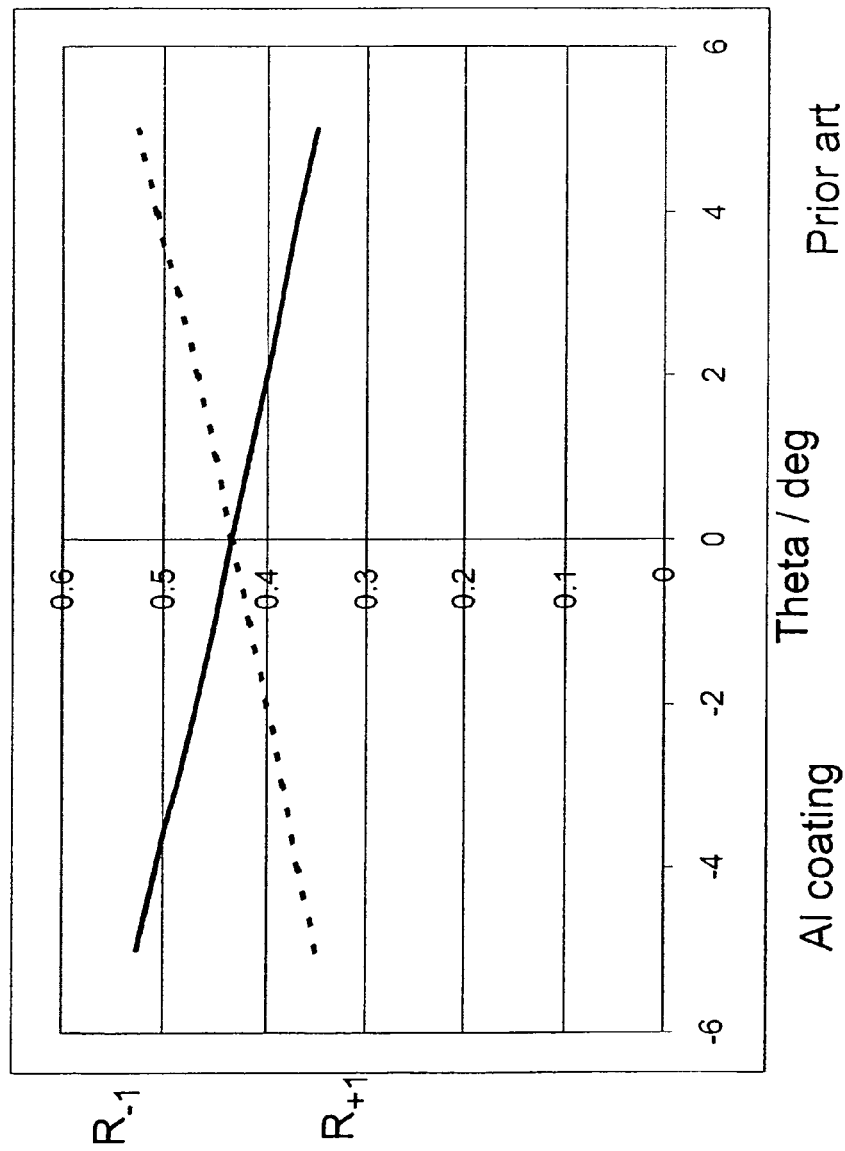
FIG. 4 shows calculated diffraction efficiency of a of a grating having symmetrical sinusoidal period profile and corresponding to the arrangement shown in FIG. 3, FIG. 5 describes schematically a prior art type use of a blazed grating in an EPE, FIG. 6 describes schematically a symmetrically splitted grating according to the invention with asymmetric period profile, FIG. 7 describes schematically a symmetrically splitted grating according to the invention with beam shift, FIG. 8 describes schematically one possible optical setup for directing the light from an imager towards the splitted grating structure when input angle θ=0, FIG. 9 same as FIG. 8 but when input angle θ<>0, FIG. 10 describes schematically an alternative optical setup for directing the light from an imager towards the splitted grating structure.
Figure 5:
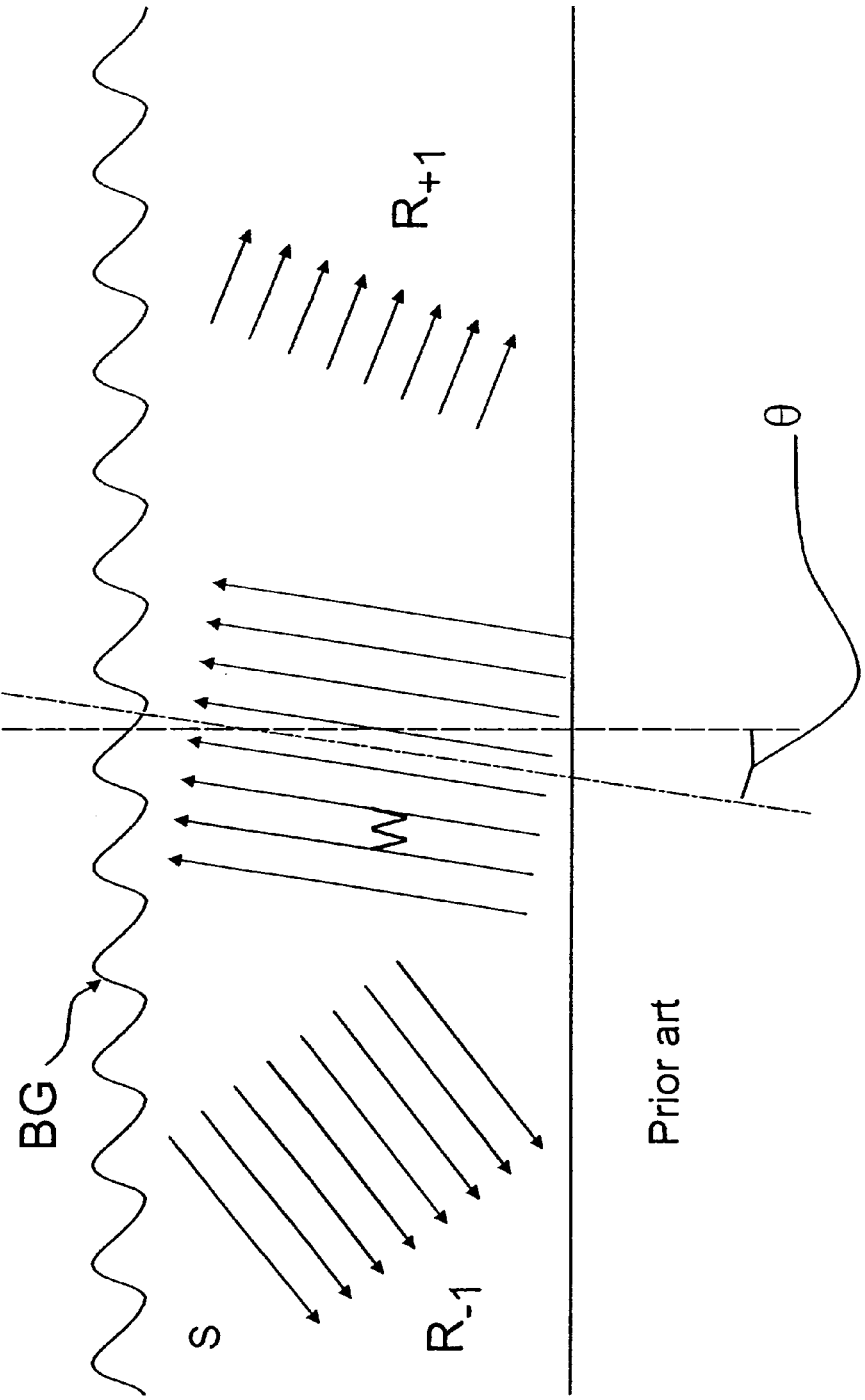

For example, the directions referring to left or right in the exemplified embodiments maybe inverted arranging the corresponding grating surfaces in an appropriate manner. The grating surfaces may also be arranged on different sides (lower, upper) of the substrate S as shown in FIGS. 1 and 2.

The exact grating profiles, grating periods or grating profile depths of the splitted grating element SG may be selected according to the specific application or materials utilized. In the splitted grating element, it is possible to use diffractive grating regions where the diffraction efficiency varies locally, for example, by arranging the depth of the grating region to be different at different local distances measured from the transition point TP.

The change in the grating profile when moving over the transition point TP may be abrupt, as in the given examples, but it may also arranged to take place in a more smooth manner.

In preferred embodiments of the invention blazed grating profiles are used, but other types of grating profiles may also be used. In a splitted grating structure SG the grating profiles on one or both sides of the transition point TP may thus be blazed, sinusoidal, height changing or of any other suitable type.

The substrate S material may be, for example, glass or plastic or other suitable light-transmittive material. The grating structure may be arranged substantially on the surface of the substrate or it may also be embedded within the substrate as a buried structure. Preferably, the substrate S is planar, but it also possible to use other forms of substrate which offer suitable waveguiding properties. The gratings or other areas of the substrate S may have suitable coatings, for example aluminium coatings, to enhance the reflectivity. It is also possible to use antireflection coatings if necessary.

The applications of the invention may include, for example, portable Internet appliances, hand-held computers, personal digital assistant devices (PDAs) advanced mobile phones and other mobile stations, digital video and still cameras, wearable computers, computer game devices, specialized bring-to-the-eye products for viewing different types of information or presentations, and other devices including high quality virtual display devices.

The invention may also used in other applications than virtual displays. In principle, the invention is suitable to be used in any application where optical beam expansion in one or more directions is required. Thus, the invention can be applied to different types of optical couplers or other light modulator devices as well.

The invention claimed is:
1. A virtual image display device, comprising
an imager for providing an image light wave; and a diffractive grating element, responsive to said image light wave, for enlarging an exit pupil of said virtual image display device for displaying said image light wave as graphics, said diffractive grating element in turn comprising a waveguiding substrate and a diffractive grating element arranged on or embedded within said substrate and arranged to interact with said image light wave in order to couple energy from said image light wave into said substrate to form at least one diffracted image light wave propagating within said substrate in a direction of selected diffraction order, said grating element comprising at least two different grating regions having different diffractive properties and arranged on opposite sides with respect to a transition point, wherein diffractions generated by said at least two different grating regions are arranged to mutually compensate for an effect of a variation in input angle of said image light wave at a given point of the grating on a total diffraction efficiency of said at least one diffracted image light wave propagating within said substrate.

2. The virtual image display device according to claim 1, wherein a grating profile of at least one of the grating regions has an asymmetric period profile, preferably a blazed period profile.

3. The virtual image display device according to claim 1, wherein said regions are arranged to be symmetrically splitted, that is, the two different grating regions have grating period profiles arranged as substantially mirror images of each other with respect to a transition point.

4. The virtual image display device according to claim 1, wherein said at least two different grating regions have grating period profiles with substantially different depths.

5. The virtual image display device according to claim 1, wherein diffraction efficiency of at least one of the grating regions is arranged to vary at different local distances measured from the transition point.

6. The virtual image display device according to claim 1, wherein the transition point is located within an area where the image light wave first interacts with the diffractive grating element.

7. The virtual image display device according to claim 1, wherein a first interaction of the image light wave with the diffractive grating element is arranged to take place substantially within a single grating region.

8. The virtual image display device according to claim 7, wherein at least one of the grating regions is arranged to redirect or recirculate the image light wave waveguided within the substrate back towards a reverse direction inside the substrate.

9. A device comprising
a waveguiding substrate;
an imager having a first location of an image point and a second location of an image point;
input optics to direct light from said first location point towards said substrate to form a first incident light wave and to direct light from said second location towards said substrate to form a second incident light wave; and
a diffractive grating element arranged to couple energy of said first incident light wave into said substrate to form first diffracted light waves propagating within said substrate in a direction of a first selected diffraction order and to form second diffracted light waves propagating within said substrate in a direction of a second selected diffraction order, said diffractive grating element also being arranged to couple energy of said second incident light wave into said substrate to form first diffracted light waves propagating within said substrate in a direction of said first selected diffraction order and to form second diffracted light waves propagating within said substrate in a direction of said second selected diffraction order, wherein said diffractive grating element comprises at least two different grating regions having different diffractive properties such that distribution of light between the direction of said first selected diffraction order and the direction of said second selected diffraction order is arranged to remain substantially the same when light is directed from said second location instead of light being directed from said first location, wherein said input optics is further arranged to shift said second incident light wave on said grating element with respect to said first incident light wave.

10. The device according to claim 9 wherein said first location is located in the center of a surface of said imager and said second location is located near the edge of the surface of said imager.

11. Apparatus comprising
waveguiding substrate means;
imager means having a first location of an image point and a second location of an image point;
input optics means to direct light from said first location towards said substrate means to form a first incident light wave and to direct light from said location point towards said substrate means to form a second incident light wave; and
a diffractive grating means arranged to couple energy of said first incident light wave into said substrate means to form first diffracted light waves propagating within said substrate means in a direction of a first selected diffraction order and to form second diffracted light waves propagating within said substrate means in a direction of a second selected diffraction order, said diffractive grating means also being arranged to couple energy of said second incident light wave into said substrate means to form first diffracted light waves propagating within said substrate means in a direction of said first selected diffraction order and to form second diffracted light waves propagating within said substrate in a direction of said second selected diffraction order, wherein said diffractive grating means comprises at least two different grating regions having different diffractive properties such that distribution of light between the direction of said first selected diffraction order and the direction of said second selected diffraction order is arranged to remain substantially the same when light is directed from said second location instead of light being directed from said first location wherein said input optics is further arranged to shift said second incident light wave on said diffractive grating means with respect to said first incident light wave.

12. The apparatus of claim 11 wherein said first location is located in the center of a surface of said imager and said second location is located near the edge of the surface of said imager.

* * * * *